US008854681B2

(12) United States Patent
Maeda

(10) Patent No.: US 8,854,681 B2
(45) Date of Patent: Oct. 7, 2014

(54) IMAGE RECORDING APPARATUS AND CONTROL METHOD FOR AN IMAGE RECORDING APPARATUS

(75) Inventor: Masao Maeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1767 days.

(21) Appl. No.: 11/849,892

(22) Filed: Sep. 4, 2007

(65) Prior Publication Data

US 2008/0060540 A1 Mar. 13, 2008

(30) Foreign Application Priority Data

Sep. 12, 2006 (JP) ................................ 2006-246552

(51) Int. Cl.
*G06F 15/00* (2006.01)
*B41J 3/407* (2006.01)
*B41J 11/00* (2006.01)

(52) U.S. Cl.
CPC .............. *B41J 3/4071* (2013.01); *B41J 11/008* (2013.01)
USPC ......... 358/1.18; 358/1.12; 358/448; 345/629; 399/187

(58) Field of Classification Search
USPC .......... 358/1.18, 1.12, 448; 345/629; 399/187
See application file for complete search history.

(56) References Cited

U.S. PATENT DOCUMENTS

| | | | | |
|---|---|---|---|---|
| 5,481,354 A * | 1/1996 | Nakajima | ..................... | 399/371 |
| 5,839,033 A * | 11/1998 | Takahashi et al. | ............ | 399/187 |
| 7,318,202 B2 * | 1/2008 | Sugiyama et al. | ............ | 715/788 |
| 2002/0145614 A1 * | 10/2002 | Van Valer | ....................... | 345/629 |
| 2004/0263561 A1 * | 12/2004 | Thiessen et al. | ................ | 347/37 |
| 2006/0256677 A1 * | 11/2006 | Bahng | .......................... | 369/47.1 |
| 2006/0268359 A1 * | 11/2006 | Maki et al. | .................... | 358/448 |

FOREIGN PATENT DOCUMENTS

| | | |
|---|---|---|
| JP | 2003-092716 A | 3/2003 |
| JP | 2004-255760 A | 9/2004 |
| JP | 2004-358714 A | 12/2004 |

OTHER PUBLICATIONS

Machine translation of Japanese Patent Document No. 2003-092716, Tamura et al., Mar. 28, 2003.*

* cited by examiner

*Primary Examiner* — David Moore
*Assistant Examiner* — Mark Milia
(74) *Attorney, Agent, or Firm* — Canon USA Inc IP Division

(57) ABSTRACT

In an image recording apparatus, when a photograph image to be printed on a printable surface area of a circular recording medium is selected, a margin area for writing a title or a description is set. Once the margin area has been set, the photograph image is arranged in an area of the printable surface area of the recording medium excluding the margin area. Then, the photograph image is printed in the area excluding the margin area of the recording medium as arranged.

16 Claims, 9 Drawing Sheets

IMAGE RECORDING APPARATUS AND CONTROL METHOD FOR AN IMAGE RECORDING APPARATUS

BACKGROUND OF THE INVENTION

1. Field of the Invention

The present invention relates to an image recording apparatus. In particular, the invention relates to an image recording apparatus configured to input a photograph image, arrange the image on a print surface of a disk medium, and perform print recording.

2. Description of the Related Art

In recent years, photograph image input apparatuses such as a digital camera and a color scanner and image output apparatuses such as a color printer have been widely spread and also achieved higher performances. Accordingly, various ways of using such an image recording apparatus have been proposed.

For example, a method of directly printing an image on a label surface of a circular disk media such as a compact disk and a DVD other than paper has been proposed for the image output apparatus.

In general, a conventional image recording apparatus is typically connected to a personal computer and configured to receive data from the personal computer for performing the printing. Such a conventional image recording apparatus may be provided with an image input unit configured to receive a photograph image directly from a digital camera and may have a function to perform printing of the photograph image directly received from the digital camera without the mediation of a personal computer. By combining such additional functions of the image recording apparatus, the image recording apparatus alone can directly receive the photograph image from the digital camera and print the image on the label surface of the disk medium.

In this manner, when an image recording apparatus can provide a variety of functions without the mediation of a personal computer, such an image recording apparatus may be designed to target a group of consumers who are not particularly familiar with personal computers. Thus, with regard to such an image recording apparatus, there is a demand to make image recording apparatuses commercially available which are easy to use even for users who are not particularly familiar with personal computers.

For operating the image recording apparatus alone, there are many cases where a display apparatus and an input apparatus mounted to the personal computer are not accommodated in the image recording apparatus, or the display apparatus and the input apparatus are inferior in performance to those of the apparatuses mounted to the personal computer. In this manner, when the image recording apparatus is operated in a restricted environment, it is desirable to simply realize such functions while requiring users to perform as few operations as possible. Also, if the image recording apparatus is designed to target a group of users who are not particularly familiar with personal computers, a devisal for obtaining a desired result with a simple operation is even more significant.

Incidentally, in a case where images or videos captured by a digital camera or a video camera are recorded on a disk medium, it may be desirable that a representative photograph image among the contents recorded on the disk medium is printed on a label surface of the disk medium.

A method of trimming an image read by using a scanner at an area equivalent of a print surface of a disk medium and printing the image is known (for example, refer to Japanese Patent Laid-Open No. 2004-358714).

In addition, a method of laying out a plurality of images on a print surface of a disk medium and printing the images is also known (for example, refer to Japanese Patent Laid-Open No. 2004-255760).

Although the print surface of the disk medium is circular, the photograph image generally has a shape of a horizontally long rectangular or a vertically long rectangular, and therefore it is necessary to determine which part of the photograph image is to be printed.

The simplest method is to cut out an image surrounded by a circle inscribed in a rectangular of the photograph image and set the position can be considered. In this case, there is a problem in that an area where the print cannot be performed exists at a center part of the disk medium and an object positioned at the center of the photograph image may be omitted.

On the other hand, there is also known a method of providing a printing apparatus with a display apparatus and an operation input apparatus, displaying a photograph image on the display apparatus, and allowing a user to set a circle at an arbitrary position with an arbitrary size. In this case, the user can arrange the image while considering on a position of the image including the area where the print cannot be performed at the center. However, there is a problem in that the operation is complicated and the display apparatus and the operation input apparatus need to be provided, which leads to the increase in costs of the printing apparatus.

In addition, there is a demand of writing a title or a description in accordance with the contents stored on the disk medium when the print is performed on the disk medium. However, if the selected photograph image is arranged on the entire print area, there is a problem in that no writing area for the title or the description exists. Of course, the title or the like can be written on the area where the photograph image has been printed, but there is a problem in that depending on a color of the photograph image, the texts on the printed image may be difficult to figure out.

SUMMARY OF THE INVENTION

An embodiment of the present invention provides an image recording apparatus in which when a photograph image to be printed on a print surface of a disk medium is arranged, an object image arranged at a center of the photograph image is considered, and a margin area for writing a title or a description is also considered.

According to an aspect of the present invention, there is provided an image recording apparatus (e.g., printer) capable of performing recording (e.g., printing) on a printable surface area of a circular recording medium. The image recording apparatus includes an input unit configured to input a photograph image; a setting unit configured to set a margin area corresponding to a portion of a recording area (e.g., printable surface area) of the circular recording medium; a control unit configured to arrange the photograph image on an area excluding the margin area of the recording medium; and a recording unit configured to record the photograph image on the area excluding the margin area of the recording medium as arranged by the control unit.

Further features of the present invention will become apparent from the following description of exemplary embodiments with reference to the attached drawings.

DESCRIPTION OF THE EMBODIMENTS

Figure 1:
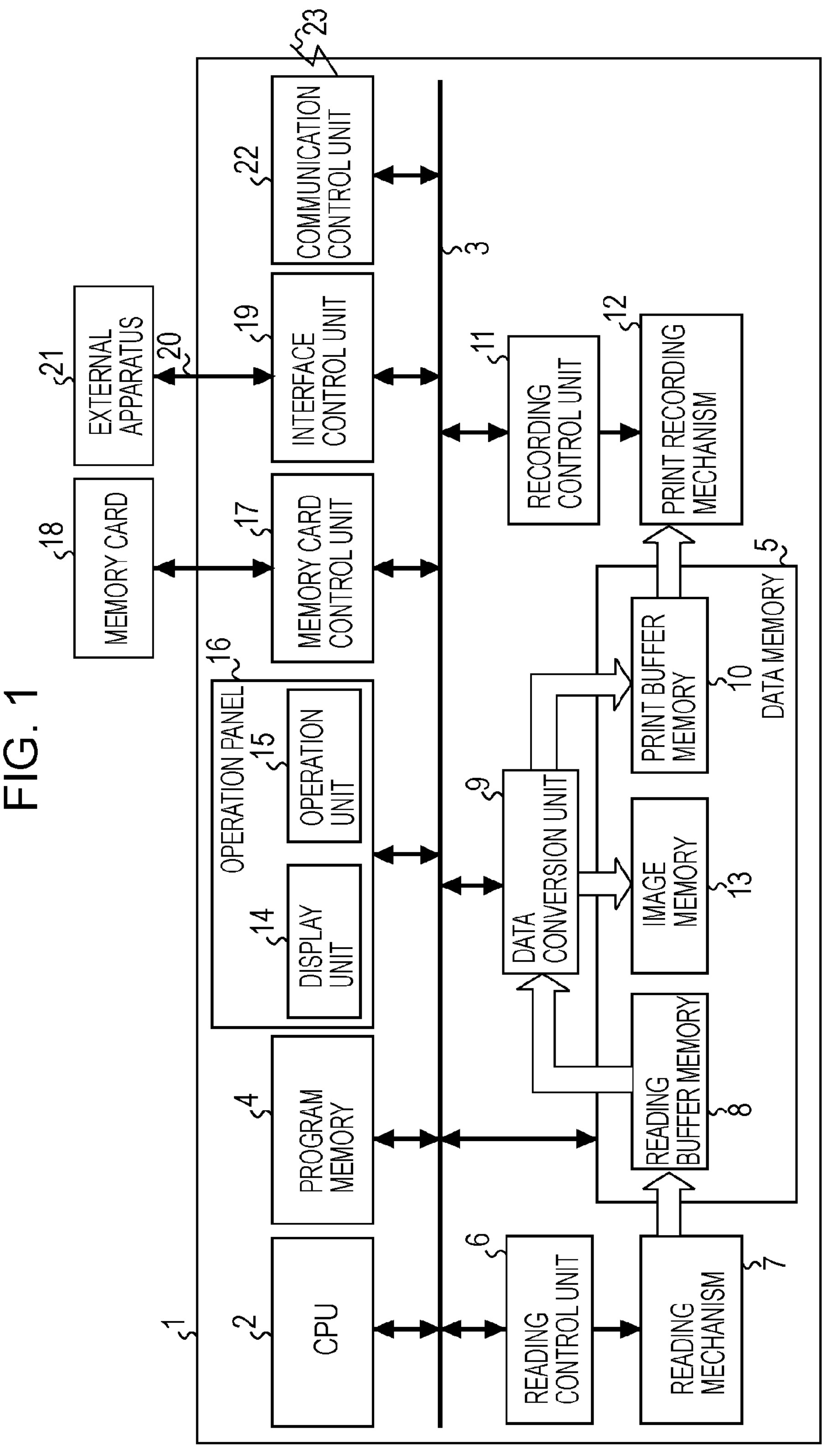
FIG. 1 is a block diagram illustrating a configuration of an image recording apparatus according to a first exemplary embodiment of the present invention.

FIG. 1 is a block diagram illustrating a configuration of an image recording apparatus 1 according to a first exemplary embodiment of the present invention.

The image recording apparatus 1 includes a CPU 2, an internal bus 3, a program memory 4, a data memory 5, a reading control unit 6, a reading mechanism 7, a data conversion unit 9, a recording control unit 11, a print recording mechanism 12, and an operation panel 16. In addition, the image recording apparatus 1 further includes a memory card control unit 17, a memory card 18, an interface control unit 19, an interface 20, and a communication control unit 22.

It is noted that the data memory 5 includes a reading buffer memory 8, a print buffer memory 10, and an image memory 13. The operation panel 16 includes a display unit 14 and an operation unit 15.

The CPU 2 includes a microprocessor and is adapted to operate in accordance with a control program and a content of the data memory 5. The program memory 4 is a memory in a ROM form which is connected via the internal bus 3 to the data memory 5 and stores the control program. The data memory 5 is a memory in a RAM form.

Also, the CPU 2 operates the reading mechanism 7 through the reading control unit 6 to store in the reading buffer memory 8 in provided the data memory, original image data read by an image sensor (not illustrated in the drawing) which is provided in the reading mechanism 7. The original image data stored in the reading buffer memory 8 is read by the data conversion unit 9 and converted into the print record data. After that, the print record data is stored in the print buffer memory 10 provided in the data memory 5.

The CPU 2 operates the print recording mechanism 12 through the recording control unit 11. In addition, the CPU 2 reads the print record data stored in the print buffer memory 10 and sends the print record data to the print recording mechanism 12 to print and record the data on a recording medium, thus realizing a copy operation. It is noted that the print recording mechanism 12 performs the data printing on a label surface of the disk medium such as a compact disk or a DVD other than the print recording on a normal paper medium.

The data memory 5 is provided with the image memory 13, which temporarily stores various image data in addition to the original image data read by the reading mechanism 7 for editing. The image data stored in the image memory 13 is read by the data conversion unit 9 and converted into the print record data to perform the print recording. Thus, in addition to the copy operation, printing of the photograph image and the like is performed. It is noted that a resource distribution among the reading buffer memory 8, the print buffer memory 10, and the image memory 13 which are on the data memory 5 can be changed by way of the control of the CPU 2. In accordance with an operation mode or an operation status such as user setting, the CPU 2 dynamically changes the resource distribution among the memories and controls the memories for the allocation and operation.

The image recording apparatus 1 is provided with the display unit 14 such as an LED or an LCD and the operation panel 16 having the operation unit 15 of various keys and the like with which it is possible to perform the various input operations by the operator, the display of operations status, and the like.

The memory card control unit 17 is configured to control accesses to the memory card 18 functioning as data storage medium and read and write image data etc. stored in the memory card 18. With this configuration, the photograph image data stored in the memory card 18 is read out to be stored in the image memory 13. Then, the image data is converted into print record data, thus making it possible to perform the print recording, etc.

The interface control unit 19 is configured to control the communication via the interface 20 and perform the transmission and reception of data with an external apparatus 21 which is connected to outside. The external apparatus 21 establishes the connection with the personal computer and receives the print record data created by a printer driver which is operated on a computer, thus making is possible to perform the print recording. In addition to the above, the external apparatus 21 may establish the connection with an apparatus such as the digital camera to read out the photograph image data and store the photograph image data in the image memory 13 to be converted into the print record data, thus achieving the print recording.

The communication control unit 22 is composed of a MODEM (modulator demodulator), an NCU (network control unit), or the like and is connected to an analog communication circuit 23. The communication control unit 22 performs a communication control and a circuit control such as call request and call-in with respect to a communication circuit.

Figure 2:
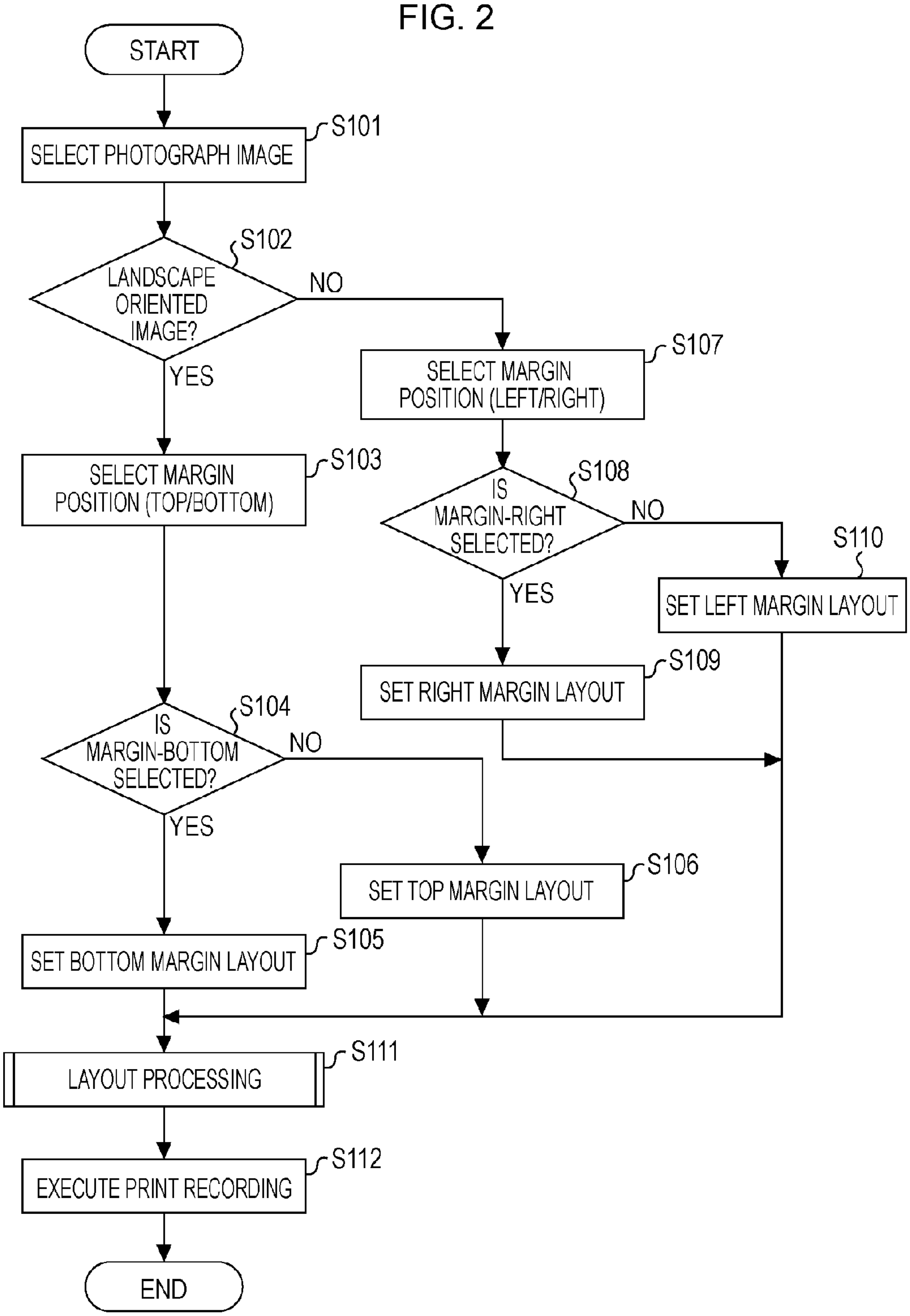
FIG. 2 is a flowchart of a process performed by the image recording apparatus according to the first exemplary embodiment.

FIG. 2 is a flowchart illustrating a process performed by the image recording apparatus 1 according to the first exemplary embodiment for selecting one of the photograph images stored in the memory card 18 and printing the selected image on a label surface of the disk medium.

First, in Step S101, the CPU 2 instructs the display unit 14 to display an image selection menu and receives user operation inputs from the operation unit 15, thus allowing the photograph image selection. In Step S102, the CPU 2 obtains the vertical and horizontal sizes of the selected photograph image to check whether the photograph image is a portrait oriented image or a landscape oriented image.

In Step S102, when the selected photograph image is a landscape oriented image (YES in Step S102), the process proceeds to Step S103 in which a margin position selection menu is displayed and a user operation input is received regarding whether the user selected margin position is the top or the bottom.

In Step S104, the CPU 2 checks whether the user has selected the top or the bottom as the margin position. When a bottom margin position is selected (YES in Step S104), the process proceeds to Step S105 in which a bottom position margin layout is selected. When a top margin position is selected (NO in Step S104), the process proceeds to Step S106 in which a top position margin layout is selected.

On the other hand, in Step S102, when the photograph image is the portrait oriented image (NO in Step S102), the process proceeds to Step S107 in which the margin position selection menu is displayed and a user operation input is received regarding whether the user selected margin position is the right or left. In Step S108, the CPU 2 checks whether the user selects the left or the right as the margin position. When the right margin position is selected (YES in Step S108), the process proceeds to Step S109 in which a right position margin layout is selected. When the left margin position is selected (NO in Step S108), the process proceeds to Step S110 in which a left position margin layout is selected.

In accordance with the layout selected in the processes in Steps S102 to S110, the CPU 2 performs the layout process to create the image to be printed and recorded (in Step S111). It is noted that a detail of this layout process will be described below. Finally, in Step S112, in accordance with the record image created in Step S111, the print recording mechanism 12 is controlled to print the image on the disk medium.

FIGS. 3A to 3D illustrate contents of four types of print layouts to be selected in processes in Steps S102 to S110 illustrated in FIG. 2 according to the first exemplary embodiment.

Figure 3A:
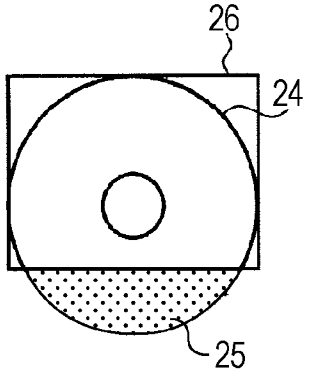
FIGS. 3A to 3D illustrate contents of four types of print layouts to be selected in processes in Steps S102 to S110 illustrated in FIG. 2 according to the first exemplary embodiment.
Figure 3B:
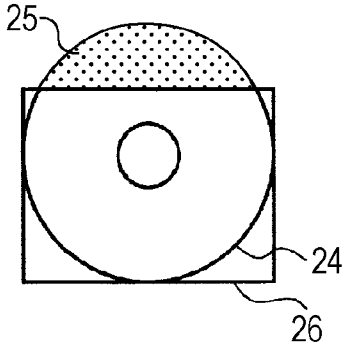
Figure 3C:
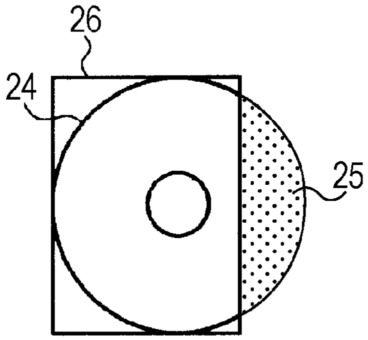
Figure 3D:
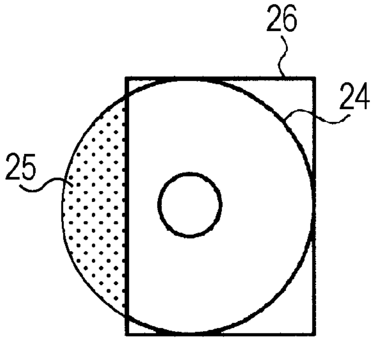

FIG. 3A illustrates the bottom margin layout, FIG. 3B illustrates the top margin layout, FIG. 3C illustrates the right margin layout, and FIG. 3D illustrates the left margin layout. In FIGS. 3A to 3D, with respect to a disk medium print area 24, a margin area 25 is set at a predetermined position and a rectangle covering the remaining area is defined as an image layout frame 26.

Next, a description will be provided of the layout process performed in Step S111.

For simplicity, a case where the photograph image is the landscape oriented and the margin area is provided on the bottom side of the photograph image will be described.

FIGS. 4A to 4D illustrate situations of a layout process.

Figure 4A:
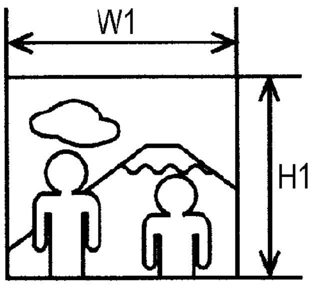
FIGS. 4A to 4D illustrate situations of a layout process.
Figure 4B:
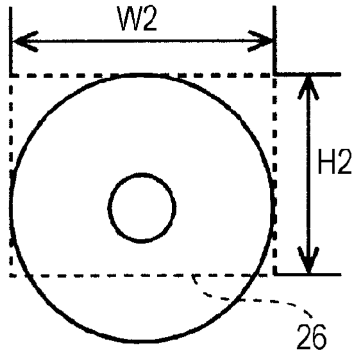
Figure 4C:
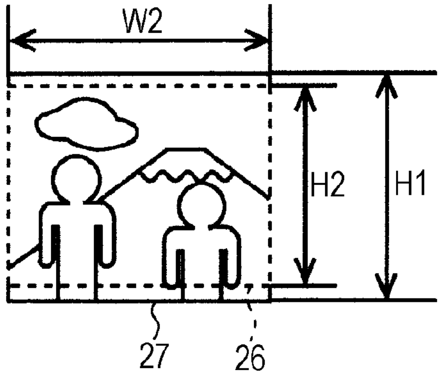
Figure 4D:
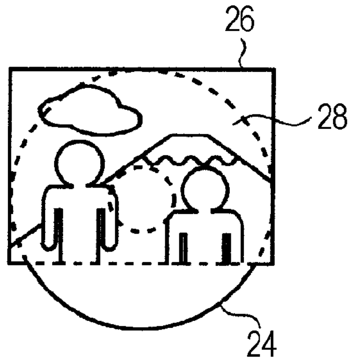

As shown in FIG. 4A, a width of a rectangle forming the outer shape of a photograph image 27 is set as W1 and a height thereof is set as H1. As shown in FIG. 4B, a width of the image layout frame 26 is set as W2 and a height thereof is set as H2. As shown in FIG. 4C, the photograph image 27 is subjected to the similarity transformation to be circumscribed in the image layout frame 26, and an overlapping part with the image layout frame 26 (within a dotted frame in the drawing) is cut out. Furthermore, as shown in FIG. 4D, the photograph image 27 is positioned at a predetermined position of the disk medium print area 24, and an overlapping part with the disk medium print area 24 (within a dotted frame in the drawing) is cut out, thus generating the print record image 28.

Figure 5:
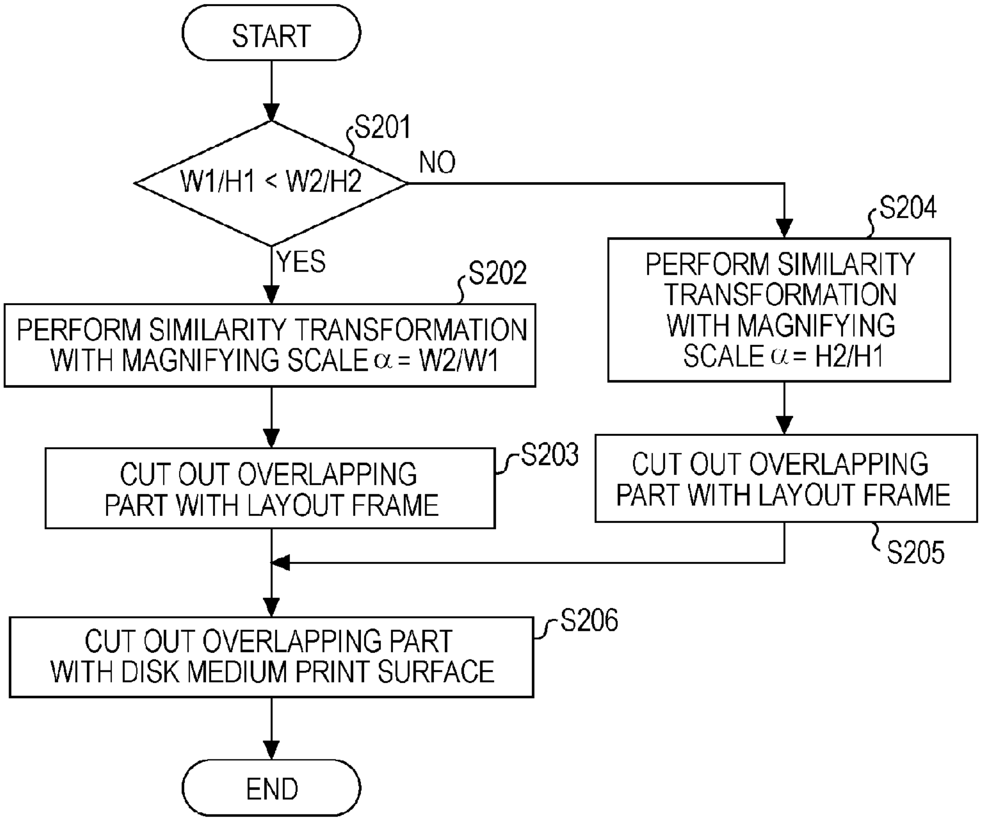
FIG. 5 is a flowchart of the layout process.

FIG. 5 is a flowchart of the layout process according to an embodiment.

In order to determine a magnifying scale of the photograph image 27, first, the CPU 2 in Step S201 compares a ratio of the width W1 and the height H1 of the rectangular forming the photograph image 27 with a ratio of the width W2 and the height H2 of the image layout frame 26. In the case of $(W1/H1)<(W2/H2)$ (YES in Step S201), the process proceeds to Step S202. In Step S202, while setting the magnifying scale of the similarity transformation $\alpha=(W2/W1)$, the similarity transformation is performed. In this case, the photograph image 27 is subjected to the similarity transformation so that the photograph image 27 runs over the top and the bottom of the image layout frame 26, and thus in Step S203, each overlapping part with the image layout frame 26 is cut out.

On the other hand, in Step S201, in the case of $(W1/H1)\geq(W2/H2)$ (NO in Step S201), the process proceeds to Step S204. In Step S204, while setting the magnifying scale of the similarity transformation $\alpha=(H2/H1)$, the similarity transformation is performed. In this case, the photograph image 27 is subjected to the similarity transformation so that the photograph image 27 runs over the left and the right of the image layout frame 26, in Step S205, each overlapping part with the image layout frame 26 is cut out.

Furthermore, in Step S206, the CPU 2 cuts only the overlapping part with the disk medium print area 24. In the above-described processes in Steps S201 to S206, it is possible to perform the layout process described in FIGS. 4A to 4D.

It is noted that in a case where the margin area is set on the top side of the photograph image, when the photograph image is the portrait oriented image, its detail description will be omitted, but it is possible to realize the effect through the similar process as the case where the margin area is provided on the bottom side of the landscape oriented photograph image. In other words, the size of the margin area is previously determined, and the similarity transformation is performed so that the photograph image is circumscribed in the image layout frame. Then, a part of the image subjected to the similarity transformation overlapping the image layout frame is cut out and furthermore a part overlapping the print area of the disk medium may be cut out.

With the above-described configuration, the margin area for writing the title and the content is provided at a part of the print surface of the disk medium, and the photograph image can be laid out and printed on the remaining area. Also, the above-described configuration, as the center of the photograph image is deviated from the center of the disk medium, the center part of the object which is often at the center of the photograph image can be prevented from falling off due to the center part of the disk medium (that is, the unprintable area).

According to the above-described embodiment, there are only two operations to be performed by the user: the operation for selecting the photograph image in Step S101; and the operation for selecting the margin position in Step S103 or S107. For this reason, while the user performs the simple operations, it is possible to obtain the desired print result.

Second Exemplary Embodiment

A second exemplary embodiment according to the present invention is an embodiment in which the size of the margin area can be selected by the user.

Figure 6:
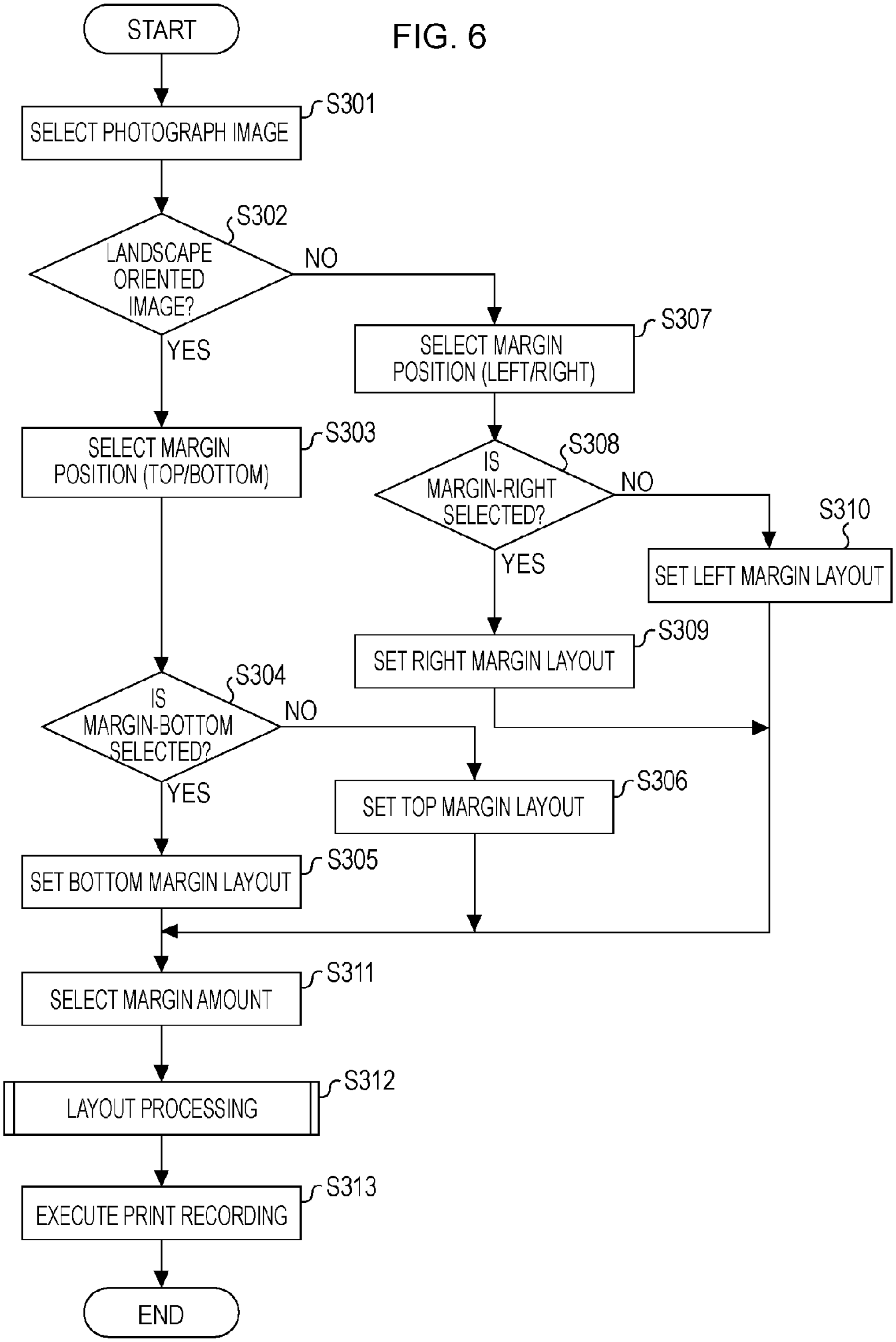
FIG. 6 is a flowchart illustrating a process content performed by a CPU of the image recording apparatus according to a second exemplary embodiment of the present invention.

FIG. 6 is a flowchart illustrating a process content performed by the CPU 2 of the image recording apparatus 1 according to the second exemplary embodiment of the present invention.

Contents in Steps S301 to S310 are exactly the same as those in Steps S101 to S110 of the flowchart illustrated in FIG. 2 according to the first exemplary embodiment. Through the processes up to Step S310, the layout is selected, and after that the CPU 2 displays a menu allowing the user to select the margin amount from large, medium, and small in Step S311. Then by monitoring the operation of the user, the margin amount is selected.

Also, a subsequent process in Step S312 is similar to the process in Step S111 of FIG. 2 and a subsequent process in Step S313 is similar to the process in Step S112.

Figure 7A:
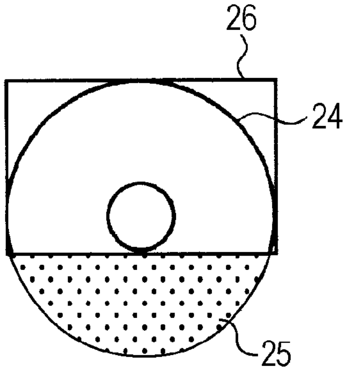
FIGS. 7A to 7C illustrate layout examples according to the second exemplary embodiment.
Figure 7B:
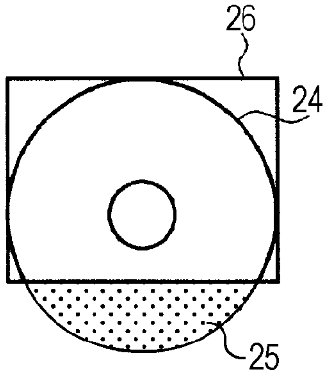
Figure 7C:
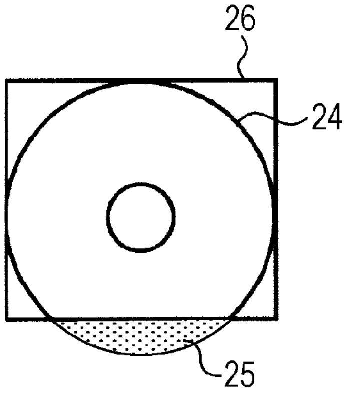

FIGS. 7A to 7C illustrate layout examples according to the second exemplary embodiment.

For simplicity, such a case is illustrated that the photograph image is the landscape oriented and the margin area is on the bottom side of the photograph image. FIG. 7A illustrates a layout example in which the margin amount is large (plenty). FIG. 7B illustrates a layout example in which the margin amount is medium. FIG. 7C illustrates a layout example in which the margin amount.

With the above-described configuration, the user can easily change the margin amount in accordance with the amount by which the title and the context are written. It is noted that the margin amount can be selected among three types of the large, medium, and small sizes according to the description described above, but furthermore the margin amount can be selected at multi-step levels.

Third Exemplary Embodiments

According to the above-described first and second exemplary embodiments, the size of the size of the margin area is determined first, and in accordance with the size, the layout of the photograph image is performed.

A third exemplary embodiments according to the present invention is an embodiment in which the margin amount is determined from an aspect ratio of a rectangular forming an outer shape of the photograph image (that is, a ratio of the long side and the short side).

A process content performed by the CPU 2 of the image recording apparatus 1 according to the third exemplary embodiments is similarly to that of FIG. 2 described in the first exemplary embodiment.

According to the third exemplary embodiments, a description will be provided of the layout process performed in Step S111 illustrated in FIG. 2.

For simplicity, a case where the photograph image is the landscape oriented and the margin area is provided on the bottom side of the photograph image will be described.

Figure 8A:
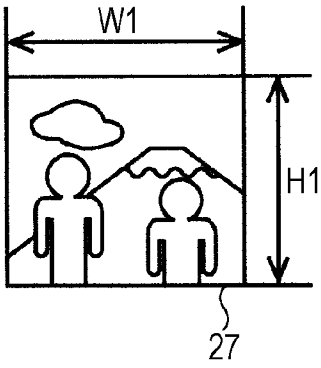
FIGS. 8A to 8C illustrate situations of a layout process.
Figure 8B:
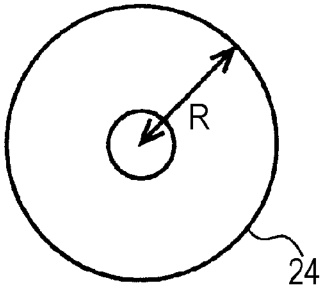
Figure 8C:
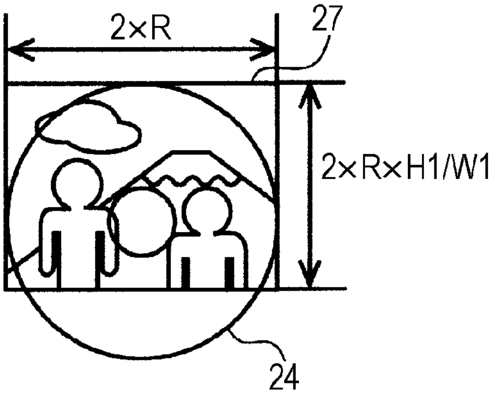

FIGS. 8A to 8C illustrate situations of a layout process.

As shown in FIG. 8A, a width of a rectangular forming the outer shape of the photograph image 27 is set as W1 and a height of the outer shape of the rectangular forming the photograph image 27 is set as H1. On the other hand, as shown in FIG. 8B, a radius of a circle forming the outer shape of the disk medium print area 24 is set as R. As shown in FIG. 8C, the photograph image 27 is subjected to the similarity transformation so that three sides in total including the top long side and the left and right short sides are circumferential with the disk medium print area 24. At this time, the photograph image is composed of the rectangular whose width is 2×R and the height is 2×R×H1/W1. This area is set as the image layout frame and the remaining area is set as the margin area.

Figure 9:
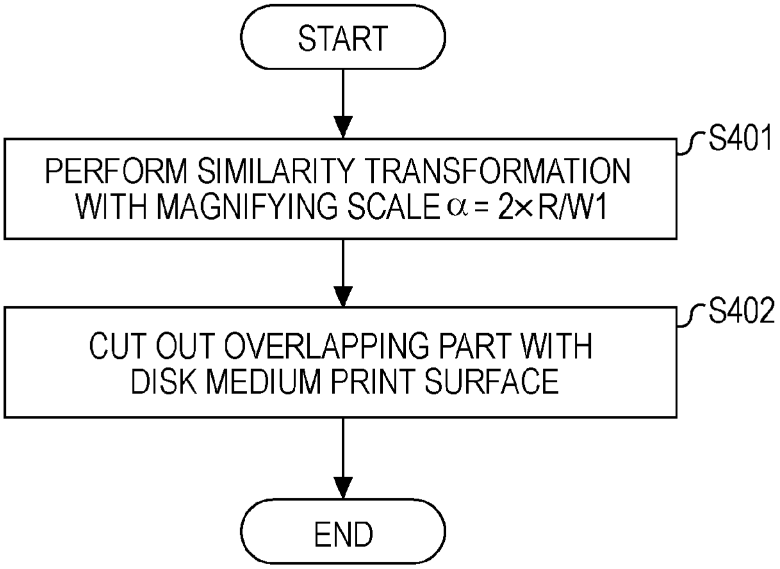
FIG. 9 is a flowchart illustrating a layout process content according to a third exemplary embodiment of the present invention.

FIG. 9 is a flowchart illustrating a layout process content according to the third exemplary embodiment of the present invention.

The CPU 2 performs the similarity transformation in Step S401 with the magnifying scale $\alpha$=(2×R/W1). In this case, the photograph image 27 is subjected to the similarity transformation to be properly fit to the image layout frame 26, and then in Step S402, a part overlapping the disk medium print area 24 is cut out. Through the processes in Steps S401 and S402, it is possible to perform the layout process described in FIGS. 8A to 8C.

It is noted that a detailed description will be omitted with respect to a case where that the margin area is provided on the top side of the photograph image and the photograph image is the portrait oriented image, but through the similar process performed when the margin area is provided on the bottom side of the landscape oriented photograph image, it is possible to realize the effect. In other words, it suffices that three sides of the photograph image is first subjected to the similarity transformation so as to be circumscribed in the disk medium area, and then this area is set as the image layout frame and the remaining area is set as the margin area.

With the above-described configuration, the layout is performed so that the top and bottom, and the left and right of the photograph image cannot be cut off as much as possible, and the remaining area is set as the margin area, thus making it possible to use the margin area for writing the title and the content.

Fourth Exemplary Embodiment

According to the first to third exemplary embodiments, the center position of the photograph image and the center position of the disk medium are shifted to each other to prevent the center part of the object from falling off from the unprintable area which is at the center part of the disk medium. In actuality, the center part of the object is not necessarily located at the center of the photograph image.

A fourth exemplary embodiment according to the present invention is an embodiment in which a feature of the photograph image is extracted and a result of detecting the object center position of the photograph image is used to select on which side of the photograph image the margin area is located.

Herein, as a method for extracting the feature of the photograph image to detect the object center position, already devised various methods can be employed.

Figure 10:
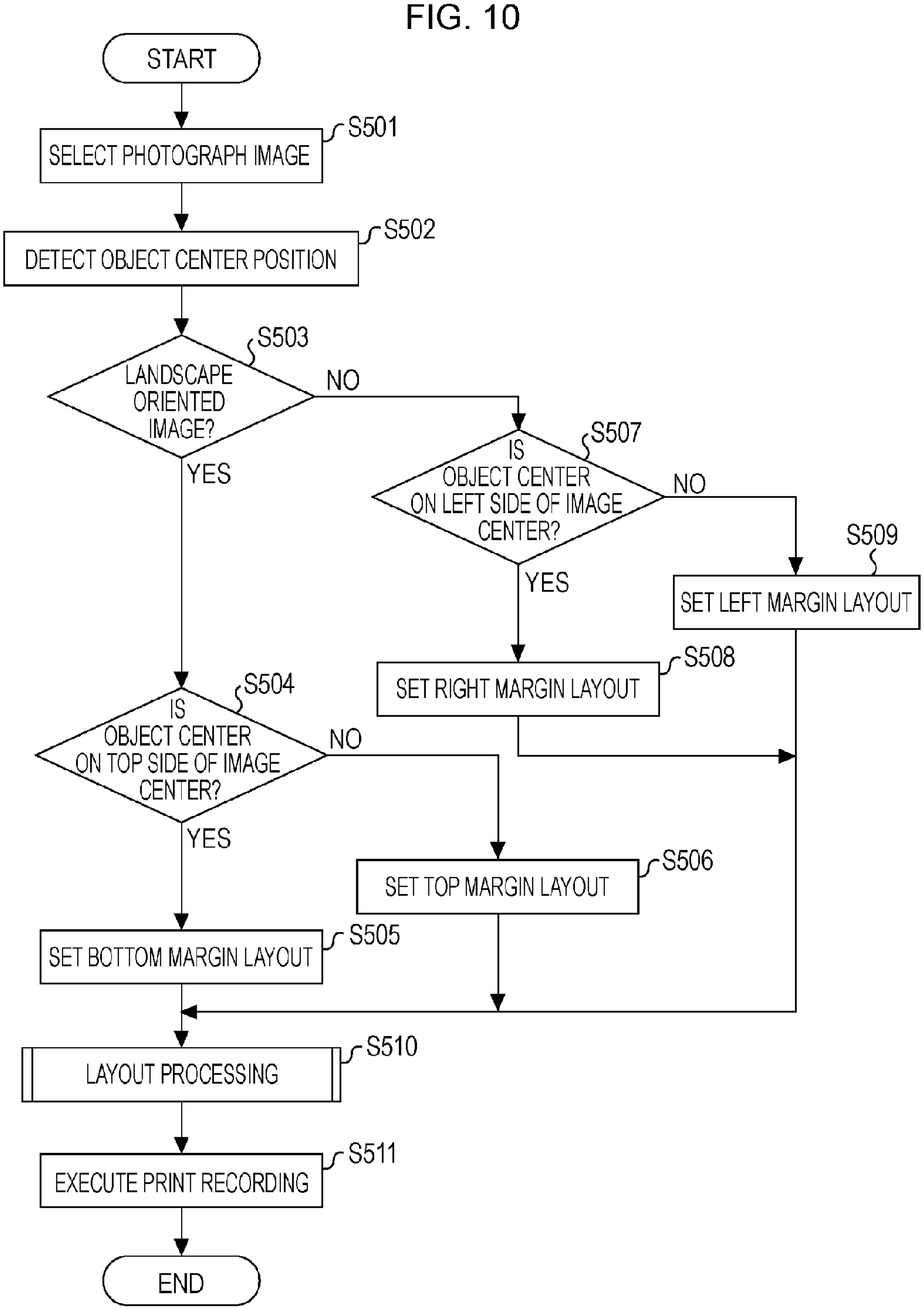
FIG. 10 is a flowchart illustrating a process content performed by the CPU according to a fourth exemplary embodiment of the present invention.

FIG. 10 is a flowchart illustrating a process content performed by the CPU 2 according to the fourth exemplary embodiment of the present invention.

In Step S501, the CPU 2 displays the image selection menu on the display unit 14 and monitors the user operation with respect to the operation unit 15, thus allowing the photograph image selection. In Step S502, through the extraction of the selected feature of the photograph image, the object center position is detected and the position is stored as (X, Y). In Step S503, the CPU 2 obtains the vertical and horizontal sizes of the selected photograph image to check whether the photograph image is a portrait oriented image or a landscape oriented image.

When it is checked in Step S503 that the photograph image is the landscape oriented image (YES in Step S503), in Step S504, it is checked whether the object center position Y coordinate detected in Step S502 is on the top side or the bottom side of the photograph image center.

When the object center position Y is on the top side of the photograph image center (YES in Step S504), in Step S505, the bottom position margin layout is selected. When the object center position Y is on the bottom side of the photograph image center (NO in Step S504), in Step S506, the top position margin layout is selected.

On the other hand, it is checked in Step S503 that the photograph image is the portrait oriented image (NO in Step S503), in Step S507, it is checked whether the object center position X coordinate detected in Step S502 is on the right side or the left side of the photograph image center. When the object center position X is on the left side of the photograph image center (YES in Step S507), in Step S508, the right position margin layout is selected.

When the object center position X is on the right side of the photograph image center (NO in Step S507), in Step S509, the left position margin layout is selected. In accordance with the layout selected through the processes in Steps S502 to S509, the CPU 2 performs the layout process to create the image to be printed and recorded (in Step S510). In Step S511, in accordance with the record image created in Step S510, the print recording mechanism 12 is controlled to print the data on the disk medium.

It is noted that types of layouts selected through the processes in Steps S502 to S509 may be similar to those described in the first exemplary embodiment. Regarding the detail of the layout process performed in Step S510 as well, it suffices that the similar processes to those described in the first or third exemplary embodiment are performed. Also, as described in the second exemplary embodiment, the process for setting the margin amount can be added.

With the above-described configuration, the center part of the object can be more reliably prevented from falling off. Also, according to fourth exemplary embodiments, the operation to be performed by the user is only the operation of selecting the photograph image in Step S501. Therefore, the user can obtain the desired print result by performing the even simpler operation as compared with the first to third exemplary embodiments.

Fifth Exemplary Embodiment

According to the first to fourth exemplary embodiments, it is assumed that no image or data is printed on the area which is provided as the margin area.

A fifth exemplary embodiment is an embodiment in which character data input via the operation unit 15 or an original image read by the reading mechanism 7 is laid out on the margin area for printing.

In addition, according to the above-described exemplary embodiments, the memory card 18 is used as an image input unit configured to input the photograph image data, but the image data in which a photograph is read by the reading mechanism 7 as the original may be input.

Furthermore, via the communication circuit 23 or the interface 20, the photograph image data may be obtained from an external apparatus.

According to the above-described exemplary embodiments, the photograph image can be arranged on the disk medium with the simple operation, the margin area for writing the title or the description can be ensured.

Moreover, according to the above-described exemplary embodiment, with the arrangement of the photograph image, the center part of the photograph image is not overlapped with the center part of the disk medium, and thus the object arranged at the center is not fallen off.

In addition, instead of directly using the photograph image selected by the user, the process according to the above-described exemplary embodiment such as the similarity transformation may be performed on an image obtained through a trimming specification set by the user on the selected photograph image. However, depending on a resolution of the trimming-specified photograph image, the trimming image may not be beautifully printed. From a relation between the resolution and the magnifying scale, a process of determining whether the printing can be performed automatically or manually.

According to the present invention, such effects can be attained that in a case where the photograph image is arranged on the disk medium, the object arranged at the center of the photograph image is not fallen off, the margin area for writing the title or the description can be ensured, and the operation is easy.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-246552 filed Sep. 12, 2006, which is hereby incorporated by reference herein in its entirety.

What is claimed is:

1. An apparatus capable of performing recording on a circular recording medium, comprising:
- an input unit configured to input image data;
- a determination unit configured to determine whether an image expressed by the image data input by the input unit is a landscape oriented image or a portrait oriented image;
- a setting unit configured to set a margin area corresponding to a portion of a recording area of the circular recording medium; and
- a control unit configured to cause a recording unit to record the image on the circular recording medium so that the image expressed by the image data input by the input unit is arranged on an area excluding the margin area set by the setting unit of the recording medium;
- wherein the setting unit automatically sets the margin area on a top or bottom side of the recording area and the control unit causes the recording unit to record the image in a manner such that a part, on an opposite side of the margin area, of the image runs over the recording medium in a case where the determination unit determines that the image expressed by the image data to be recorded on the circular recording medium is a landscape oriented image and automatically sets the margin area on a left or right side of the recording area and the control unit causes the recording unit to record the image in manner such that a part, on an opposite side of the margin area, of the image runs over the recording medium in a case where the determination unit determines that the image expressed by the image data to be recorded on the circular recording medium is a portrait oriented image.

2. The apparatus according to claim 1, wherein the recording unit is configured to print the image on a print surface area excluding the margin area of the recording medium as arranged by the control unit.

3. The apparatus according to claim 1, further comprising a selection unit configured to select a position of the margin area set by the setting unit.

4. The apparatus according to claim 1, further comprising a switching unit configured to switch a size of the margin area, wherein the setting unit sets the size of the margin area in accordance with the switching unit.

5. The apparatus according to claim 1, further comprising a conversion unit configured to convert the image, wherein the control unit arranges on an area excluding the margin area, the image which has been subjected to a similarity transformation so that an outline of the image is circumscribed in a circumferential part of the circular recording medium by the conversion unit.

6. The apparatus according to claim 1, further comprising a detection unit configured to detect a position of a particular part of the image, wherein the setting unit sets the margin area in accordance with the particular part detected by the detection unit.

7. The apparatus according to claim 1, further comprising an input unit configured to input a character text to be arranged on the margin area.

8. The apparatus according to claim 1, further comprising an input unit configured to input a handwriting original, wherein the control unit performs a control to arrange the handwriting original input by the input unit on the margin area.

9. The apparatus according to claim 1, further comprising the recording unit.

10. A method for an apparatus capable of performing recording on a circular recording medium, comprising:

inputting image data;

determining whether an image expressed by the received image data is a landscape oriented image or a portrait oriented image;

setting a margin area corresponding to a portion of a recording area of a recording medium; and recording the image on the circular recording medium so that the image expressed by the input image data is arranged on an area excluding the set margin area of the recording medium;

wherein the margin area is automatically set on a top or bottom side of the recording area and the image is recorded in a manner such that a part, on an opposite side of the margin area, of the image runs over the recording medium in a case where it is determined that the image expressed by the image data to be recorded on the recording medium is a landscape oriented image and the margin area is automatically set on a left or right side of the recording area and the image is recorded in a manner such that a part, on an opposite side of the margin area, of the image runs over the recording medium in a case where it is determined that the image expressed by the image data to be recorded on the recording medium is a portrait oriented image.

11. The method according to claim 10, further comprising:

arranging a character text on the margin area; and printing the character text on the margin area of the recording medium as arranged.

12. The method according to claim 10, wherein the recording medium comprises a circular recording medium.

13. A method for an apparatus capable of printing on a surface of a circular recording medium, the method comprising:

receiving image data;

determining whether an image expressed by the received image data is a landscape oriented image or a portrait oriented image;

selecting a margin area of the circular recording medium; and recording the image on the circular recording medium so that the image expressed by the input image data is arranged on an area excluding the selected margin area of the circular recording medium;

wherein the margin area is selected on a top or bottom side of the recording area and the image is recorded in a manner such that a part, on an opposite side of the margin area, of the image runs over the recording medium in a case where it is determined that the image expressed by the image data to be recorded on the circular recording medium is a landscape oriented image and the margin area is selected on a left or right side of the recording area and the image is recorded in a manner such that a part, on an opposite side of the margin area, of the image runs over the recording medium in a case where it is determined that the image expressed by the image data to be recorded on the circular recording medium is a portrait oriented image.

14. An apparatus capable of printing on a surface of a circular recording medium, the apparatus comprising:

an input unit configured to input image data;

a selection unit to select a margin area of the circular recording medium;

a determination unit configured to determine whether an image expressed by the image data input by the input unit is a landscape oriented image or a portrait oriented image;

a control unit configured to cause a recording unit to record the image on the circular recording medium so that the image expressed by the image data input by the input unit is arranged on an area excluding the selected margin area of the circular recording medium; and wherein the margin selection unit selects the margin area on a top or bottom side of the recording area and the image is recorded in a manner such that a part, on an opposite side of the margin area, of the image runs over the recording medium in a case where the determination unit determines that the image expressed by the image data to be recorded on the circular recording medium is a landscape oriented image and selects the margin area on a left or right side of the recording area and the image is recorded in a manner such that a part, on an opposite side of the margin area, of the image runs over the recording medium in a case where the determination unit determines that the image expressed by the image data to be recorded on the circular recording medium is a portrait oriented image.

15. The apparatus according to claim 14, wherein the margin selection unit selects the margin area of the circular recording medium based on a user input.

16. The apparatus according to claim 14, wherein the margin selection unit determines an orientation of the image to be recorded on the recording medium.

* * * * *